June 11, 1957  J. K. GAYLORD  2,795,302
BRAKE DRUM COOLING DEVICE
Filed Dec. 8, 1953  2 Sheets-Sheet 1

INVENTOR.
James K. Gaylord
BY
Mary, Desmond & Parker
Attys.

June 11, 1957 J. K. GAYLORD 2,795,302
BRAKE DRUM COOLING DEVICE
Filed Dec. 8, 1953 2 Sheets-Sheet 2
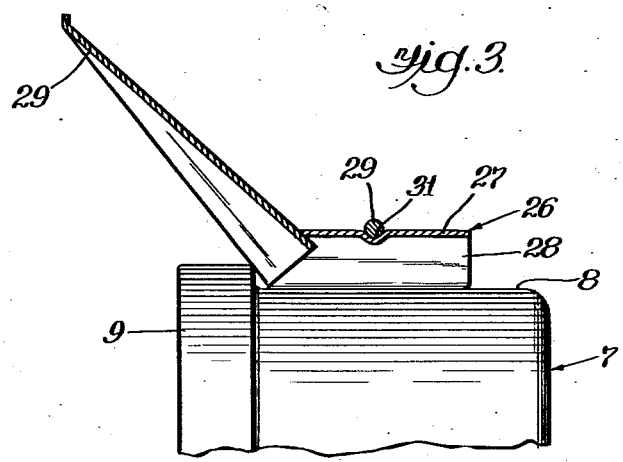
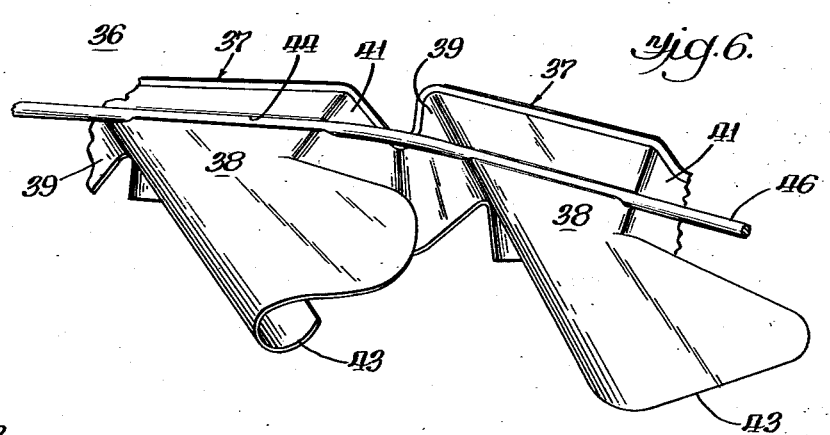
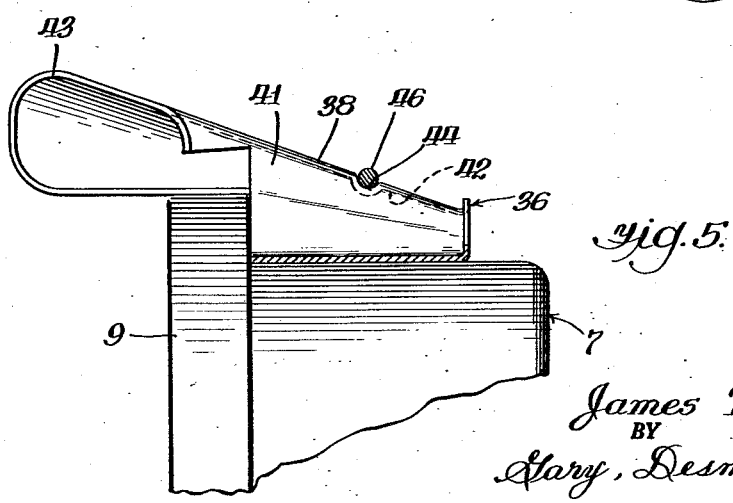
INVENTOR.
James K. Gaylord
BY
Mary, Desmond & Parker
Attys.

United States Patent Office 2,795,302
Patented June 11, 1957

2,795,302
BRAKE DRUM COOLING DEVICE

James K. Gaylord, Chicago, Ill., assignor to Gaylord Products, Incorporated, Chicago, Ill., a corporation of Delaware Application December 8, 1953, Serial No. 396,979

4 Claims. (Cl. 188—264)

This invention relates to brake drum cooling devices, and more particularly to devices adapted for use in cooling automobile brake drums to increase the efficiency of the brakes and to prolong the service life of the brake lining.

During the application of a brake on an automobile traveling down steep grades, the brake drum and brake lining have heretofore been heated to a relatively high temperature, thereby decreasing the efficiency of the brakes and the service life of the brake lining.

It is an object of the present invention to provide a device operative to direct streams of cool air into direct contact with the brake drum of an automobile to prevent overheating of the brake drum and brake lining associated therewith.

Another object of the invention resides in the provision of a device adapted to be applied to conventional brake drums without the use of skilled mechanics or special tools and equipment.

A further object of the invention resides in the provision of a brake drum cooling device which is relatively simple and inexpensive in construction and reliable in use.

The invention embodies other novel features, details of construction and arrangement of parts which are hereinafter set forth in the specification and claims and illustrated in the accompanying drawings, wherein:

Fig. 4 is a fragmentary side elevational view of same.

Fig. 5 is a transverse sectional view illustrating another modified form of the invention.

Fig. 6 is a fragmentary perspective view of same.

Figure 1:
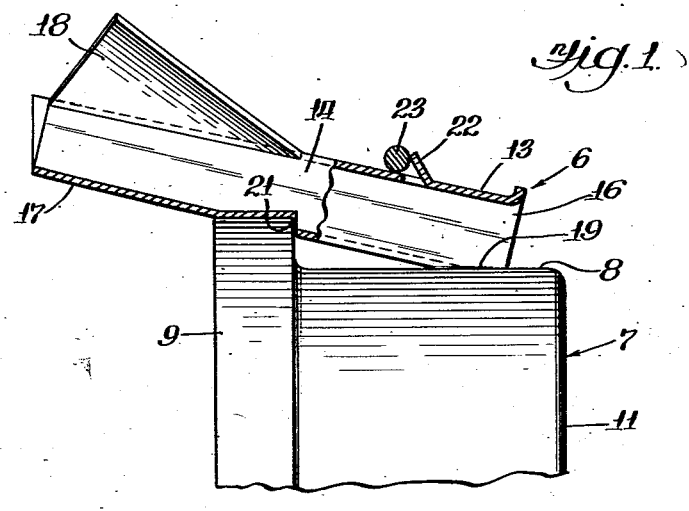
Fig. 1 is a transverse sectional view illustrating a brake drum cooling device embodying features of the invention, the device being shown as applied to a conventionel automobile brake drum.
Figure 2:
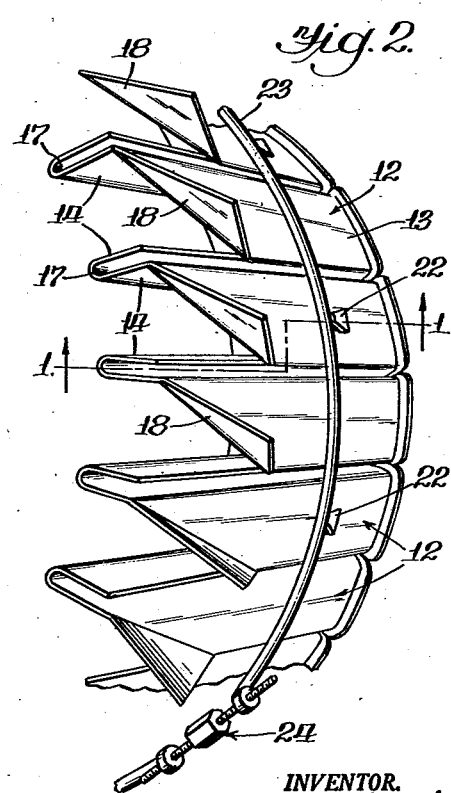
Fig. 2 is a fragmentary perspective view of the device shown in Fig. 1.

Referring now to the drawings for a better understanding of the invention and more particularly to Figs. 1 and 2 therein, the brake drum cooling device, indicated generally at 6, is shown as applied to a conventional automobile brake drum 7 having a tapered outer wall 8 merging with an annular inboard rim 9, the outboard or end wall 11 of the brake drum being secured to the wheel of an automobile by conventional means.

The cooling device is shown as formed from a single blank of sheet metal, such as aluminum, having a relatively high coefficient of heat conductivity, the blank being bent at spaced intervals along transverse lines to form a plurality of interconnected, generally U-shape sections 12 circumferentially arranged about the brake drum to form a cooling ring. If desired, opposite ends of the blank may be secured together by rivets, welding or other suitable means to eliminate any split in the ring.

Each U-shape section 12 is shown as comprising an outer wall 13 and spaced side walls 14—14 to define with the brake drum wall 8 an air passageway 16. The side walls of each section 12 are spaced from and connected by junctures 17 to the side walls of adjacent sections. The inboard portions of the outer walls 13 are slit and bent to form fins 18 adapted to direct streams of cooling air into and through their respective passageways 16 for direct contact against the outer wall 8 of the brake drum during operation of an automobile.

Each juncture 17 is preferably formed with spaced notches 19 and 21 substantially conforming to the contour of the outer wall 8 and rim 9, respectively, as illustrated in Fig. 1. The outer walls 13 of alternate sections 12 are formed with abutment tongues or shoulders 22 for engagement against a loop of wire 23 encircling the cooling device 6 to clamp the device in fixed position around the brake drum. If desired, a turnbuckle 24 may be interposed in the wire loop 23 to facilitate assembly of the cooling device on a brake drum.

During rotation of a brake drum with the cooling device mounted thereon, the fins 18 act to force streams of air into and through their respective passageways 16 to cool the brake drum. It will also be noted that the cooling device is of accordion construction, permitting expansion and contraction to different diameters to accommodate brake drums of different diameters.

Figure 3:
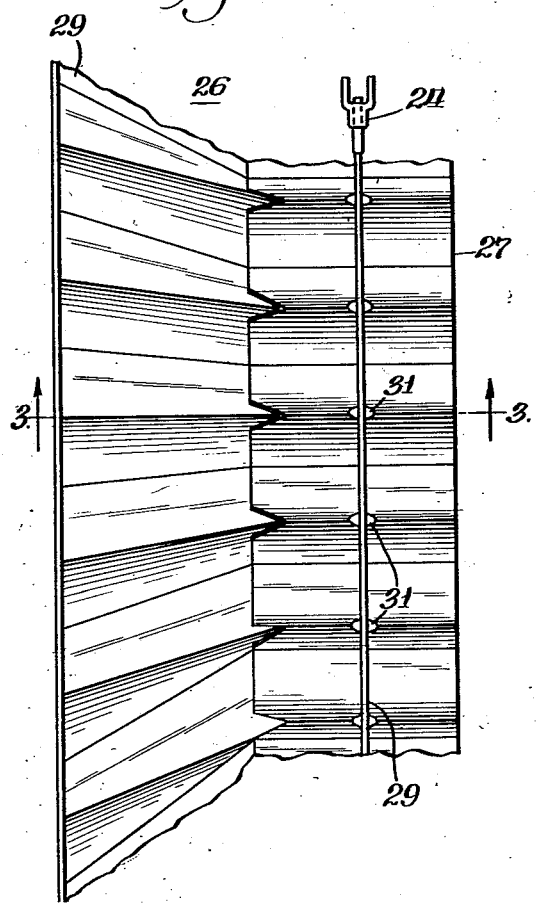
Fig. 3 is a transverse sectional view illustrating a modified form of the invention.

Figs. 3 and 4 in the drawings illustrate a modified form of the invention in which the cooling device, indicated generally at 26, is shown as comprising a tubular corrugated body 27 adapted to encircle a brake drum 7 and define therewith a plurality of circumferentially-spaced axially-extending passageways 28 for the passage of streams of cooling air directly against the brake drum.

An annular corrugated flange 29 is welded or otherwise secured to the body 27 and projects outwardly at an angle to the axis thereof to cause streams of cooling air to move through the passageways 28 during rotation of the brake drum.

The cooling device 26 is adapted to be tightly secured on a brake drum by means of a loop of steel wire 29 seated in recesses 31 formed in the body 27, a turnbuckle being interposed in the loop to tension the wire. It will be noted that the generally accordion type structure of the body 27 and flange 29 adapts the device for use on brake drums of different diameters.

Figs. 5 and 6 in the drawings illustrate another modified form of the invention in which the cooling device, indicated generally at 36, is shown as applied to the brake drum of an automobile to direct streams of cooling air directly against and across the outer surface of the drum.

In this form of the invention, the cooling device is shown as blanked and formed from sheet material, such as aluminum, to provide an annular body encircling the drum. The body comprises a plurality of interconnected sections 37, each section having an outer wall 38 and side walls 39 and 41 to define with the brake drum an air passageway 42.

The outer wall 38 and side wall 39 of each section 37 extend inboardly of the brake drum to provide an air scoop 43 inclined forwardly from its respective passageway 42 in the direction of rotation of the drum to direct a stream of cooling air into and through the passageway and directly against the outer surface of the drum.

Recesses 44 are provided in the outer walls 39 of the several sections 37 to form seats for a loop of steel wire 46 employed to tightly secure the sections against the outer surface of the brake drum, the wire being tensioned by a conventional turnbuckle.

In this form of the invention it will be noted that the outer walls 38 and side walls 39 and 41 are so formed and interconnected as to provide an annular accordion type structure capable of being expanded or contracted to different diameters to facilitate mounting of the cooling devices upon brake drums of different diameters.

While the invention has been shown in several forms, it is obvious to those skilled in the art that it is not so limited, but is susceptible of various changes and modifications without departing from the spirit and scope of the claimed invention.

I claim as my invention:

1. In a brake drum cooling device, a brake drum, a plurality of interconnected sections arranged to engage the outer annular surface of the brake drum to define therewith a plurality of air passageways, means provided on said sections to move streams of air through said passageways during rotation of the device on the brake drum, each section having side walls joined to the side walls of adjacent sections to form an annular accordion type structure capable of being expanded and contracted to different diameters to facilitate mounting of the device on brake drums of different diameters, and a loop of wire to encircle and clamp the sections in fixed position upon the brake drum.

2. In a cooling device for a brake drum, a plurality of interconnected sections arranged to engage the outer annular surface of a brake drum to define therewith a plurality of air passageways, means provided on said sections to move streams of air through said passageways during rotation of the device on a brake drum, each section having side walls joined to the side walls of adjacent sections to form an annular accordion type structure capable of being expanded and contracted to different diameters to facilitate mounting of the device on brake drums of different diameters, a loop of wire to encircle and clamp the sections in fixed position upon a brake drum, and turnbuckle means to tension the loop of wire.

3. In a cooling device for a brake drum, a plurality of interconnected sections arranged to engage the outer annular surface of a brake drum to define therewith a plurality of air passageways, means provided on said sections to move streams of air through said passageways during rotation of the device on a brake drum, each section having side walls joined to the side walls of adjacent sections to form an annular accordion type structure capable of being expanded and contracted to different diameters to facilitate mounting of the device on brake drums of different diameters, a loop of wire to encircle and clamp the sections in fixed position upon a brake drum, and means to tension the loop of wire.

4. In a brake drum cooling device, a brake drum, a plurality of sections having side walls, the side walls of each section being joined to the side walls of adjacent sections to provide an annular accordion type structure capable of being expanded and contracted to different diameters, and a loop retainer to encircle and clamp the device upon the brake drum, each section defining with the brake drum an air passageway, and means on each section to deflect air into and through its related passageway repsonsive to rotational movement of the brake drum.

References Cited in the file of this patent

UNITED STATES PATENTS

| | | |
|---|---|---|
| 1,928,079 | Taylor | Sept. 26, 1933 |
| 2,425,116 | Musselman | Aug. 5, 1947 |
| 2,659,459 | Lyon | Nov. 17, 1953 |
| 2,659,460 | Lyon | Nov. 17, 1953 |
| 2,701,037 | Lyon | Feb. 1, 1955 |
| 2,720,947 | Martin | Oct. 18, 1955 |

FOREIGN PATENTS

| | | |
|---|---|---|
| 572,202 | Great Britain | Sept. 27, 1945 |